United States Patent [19]

Vaidyanathan et al.

[11] 4,228,002
[45] Oct. 14, 1980

[54] ENHANCED ANTI-SOLVENT SEDIMENTATION OF SOLIDS FROM LIQUIDS USING PRESSURIZED CARBON DIOXIDE GAS

[75] Inventors: Kumbakonam R. Vaidyanathan; Joseph D. Henry, Jr.; Francis H. Verhoff, all of Morgantown, W. Va.

[73] Assignee: Electric Power Research Institute, Inc., Palo Alto, Calif.

[21] Appl. No.: 942,742

[22] Filed: Sep. 15, 1978

[51] Int. Cl.$^2$ .................................... B01D 21/01
[52] U.S. Cl. ........................... 210/729; 208/251 R; 210/738
[58] Field of Search ............... 208/251 R; 210/42 R, 210/43, 48, 51, 54, 49

[56] References Cited

U.S. PATENT DOCUMENTS

| | | | |
|---|---|---|---|
| 2,650,898 | 9/1953 | Case | 208/251 R |
| 4,021,335 | 5/1977 | Beaton | 208/251 R |
| 4,081,360 | 3/1978 | Tan et al. | 210/54 |
| 4,082,643 | 4/1978 | Gatsis et al. | 210/54 |
| 4,082,644 | 4/1978 | Gatsis | 210/54 |
| 4,090,958 | 5/1978 | Leonard | 210/54 |

FOREIGN PATENT DOCUMENTS

722406  7/1942  Fed. Rep. of Germany ...... 208/251 R

*Primary Examiner*—Thomas G. Wyse
*Assistant Examiner*—Peter A. Hruskoci
*Attorney, Agent, or Firm*—Flehr, Hohbach, Test, Albritton & Herbert

[57] ABSTRACT

A method for increasing the sedimentation of mineral particles in feed liquids containing the same, particularly coal-derived liquids, by the use of an anti-solvent gas pressure technique. The mixture is held under a pressurized carbon dioxide atmosphere which causes an increase in the initial settling rate for sedimentation of the mineral particles from such liquids so that they may be used as fuels.

7 Claims, 1 Drawing Figure

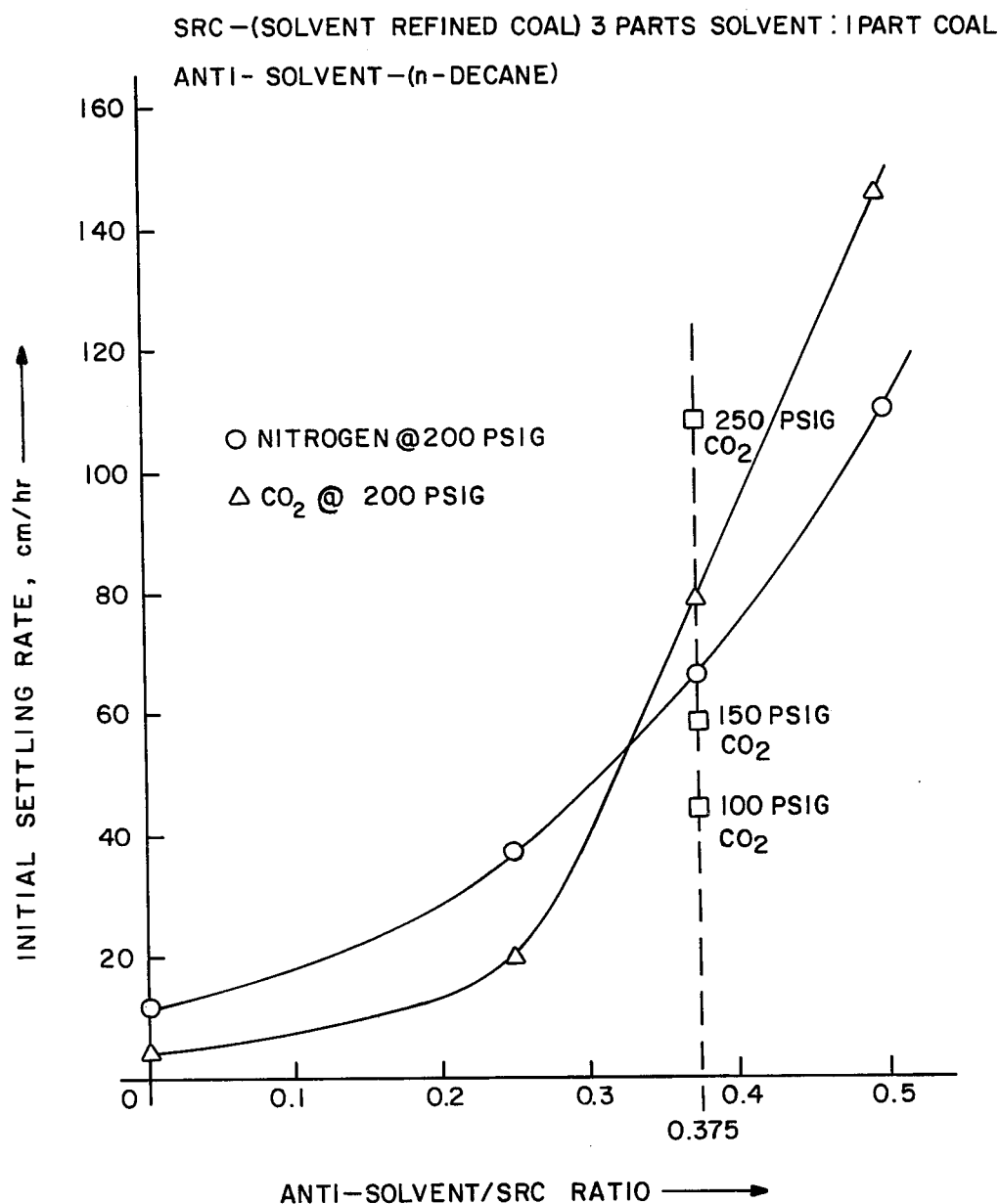
FIG.—1

ENHANCED ANTI-SOLVENT SEDIMENTATION OF SOLIDS FROM LIQUIDS USING PRESSURIZED CARBON DIOXIDE GAS

CROSS-REFERENCE TO DISCLOSURE DOCUMENT PROGRAM

A disclosure document for this invention has been filed with the patent Office. It has been assigned Disclosure Document No. 064826, and has a date of receipt of Oct. 11, 1977.

BACKGROUND OF THE INVENTION

There is considerable interest in the commercial development of coal liquification processes to produce fuels which are convenient to handle. Liquified coal must meet certain specifications regarding mineral (ash and sulfur) content for use as boiler and gas turbine fuels. In general, liquified coals include asphaltic materials (asphaltenes and pre-asphaltenes) together with such mineral matter, typically including silicates and iron sulfides as major components.

The coal-derived asphaltic materials have lower molecular weight than asphaltenes from petroleum origin and strongly influence the viscosity of the liquified coal. It is thought that anti-solvent precipitation of such asphaltic materials causes the concommitant precipitation of such mineral matter. The initial rate of precipitation from asphaltics, and thus removal of mineral matter, is known to be increased by the addition of anti-solvent which decrease the solubilities of the asphaltic materials. A wide variety of hydrocarbons are known to be useful anti-solvents for this purpose.

SUMMARY OF THE INVENTION AND OBJECTS

In accordance with the present invention, the initial settling rate of mineral matter from feed liquid containing asphaltic materials by the use of an anti-solvent for asphaltic material is substantially increased by maintaining the mixture under a pressurized carbon dioxide atmosphere under the conditions set forth herein. Specifically, the effect of the carbon dioxide occurs at a predetermined minimum pressure determined by the anti-solvent to feed material ratio. The process is particularly effective for removing mineral matter such as silicates and iron sulfides from solvent refined coal (SRC) or other coal-derived liquids.

It is a primary object of the present invention to provide a method for increasing the settling rate of asphaltic materials from a feed liquid containing the same by the anti-solvent techniques of the prior art.

It is a particular object of the invention to provide a method of the foregoing type accomplished in an economical manner under the influence of a pressurized inexpensive gas, carbon dioxide.

It is a further object of the invention to provide a technique of the foregoing type capable of accelerating the precipitation of mineral matter from such feed liquids, especially ones derived from coal.

Further objects and features of the invention will be apparent from the following description of its preferred embodiments taken in conjunction with the accompanying drawings.

BRIEF DESCRIPTION OF THE DRAWINGS

FIG. 1 is a comparative graph of the initial settling rate versus the solvent/SRC ratio under nitorgen and carbon dioxide pressure.

DETAILED DESCRIPTION OF THE PREFERRED EMBODIMENTS

The present invention is directed to increasing the initial settling rate of asphaltic materials from feed liquids containing the same, particularly, coal-derived liquids, using an improved anti-solvent technique. More specifically, it is directed to the higher initial settling rate of mineral matter, typically comprising silicates and iron sulfides as a major component, entrained in the precipitating asphaltic materials. The mineral matter sedimentation rate is increased by entrapment of the mineral matter and/or promotion of the agglomeration of mineral matter of the precipitated asphaltic fractions. It is recognized that the initial settling rate of such mineral matter is an important design parameter for a system for the effective reduction of mineral matter in such feed liquid.

Solvent refined coal (herein SRC), an important coal-derived liquid, may include a wide range of ratios of coal to solvent. Depending upon such ratios and the coal source, the mineral content of SRC typically ranges from 3 to 21% by weight. It is important to lower the mineral matter concentration for use as fuels, to about 0.4 weight percent for boiler fuels, and to 0.1 weight percent for gas turbine fuels.

Although the present process is applicable to increasing the initial settling rate of mineral matter from other liquids containing the same, it is particularly effective for precipitation of the foregoing mineral matter from coal-derived fluids for subsequent applications such as boiler or gas turbine fuels. The present description will refer to coal-derived fluid of the SRC type.

It is known that the effectiveness of various anti-solvents for increasing the initial settling rate from SRC is dependent on various anti-solvent properties such as solubility parameter, hydrogen bonding, dielectric constant, carbon to hydrogen ratio, and other factors. The present invention is applicable to any anti-solvent useful for enhancing the initial settling rate of mineral matter. Known anti-solvents include normal paraffinic materials from n-butane to n-decane, mixed saturated branch chained hydrocarbons such as Soltrol-130, cyclic compounds such as cyclohexane, methyl cyclohexane and the like, and aromatic compounds such as benzene, toluene, styrene and cresol.

The ratio of anti-solvent to feed material (herein the anti-solvent ratio) is an important factor in determining the initial settling rate. In general, an increase in the anti-solvent ratio leads to a corresponding increase in the settling rate. The particulate settling rate for a given system is also dependent upon many other factors including the temperature of the system, the particular feed material, the particular solvent, and other factors.

Applicants' invention resides in the discovery that for a minimum anti-solvent ratio, the presence of a pressurized carbon dioxide atmosphere during sedimentation causes a marked increase in the sedimentation rate. In contrast, at anit-solvent-solvent ratios below this critical minimum value, the presence of the carbon dioxide can actually lead to a decrease in the settling rate. The ability to increase the settling rate at higher anti-solvent ratios is a significant economical advantage in that less anti-solvent need be used. In addition, it has been found that the final level of precipitation is a function of such initial settling rate. Thus, presence of the pressurized carbon dioxide atmosphere can lower the mineral content to the desired low levels for various fuel uses.

In general, the process of the present invention is contemplated for use in a coal liquification plant wherein the coal-derived fluid is already at an elevated temperature (e.g., 400°–600° F.). In the first stage of the precipitation process, the anti-solvent and coal-derived liquid are mixed at such elevated temperature. It has been found that the rate of precipitation increases with decreased mixing speeds and times. In a batch process, after mixing, the feed liquid containing anti-solvent is transferred to a precipitation or settling tank maintained under relatively quiescent conditions. Simultaneously, the mineral particles are caused to precipitate, theoretically by a mechanism of entrapment in the asphaltic material and/or promotion of the agglomeration of such mineral matter. It is possible that at least part of the increase in the sedimentation rate of the mineral matter is attributable to colloid destabilization effects, e.g., by a reduction in the dielectric constant of the continuous phase. Anti-solvents may also reduce the viscosity of the continuous oil phase producing an increase in the sedimentation rate.

As set out above, in a batch process, the mixing of anti-solvent and feed material is performed in mixing vessel and thereafter transferred to a sedimentation vessel maintained in a relatively quiescent condition. It should be understood, that in a continuous process, the two steps may be performed in a single flowthrough vessel so long as the two stages are carried out in the indicated sequence.

In a typical batch operation, after mixing, the material containing anti-solvent is directed to the sedimentation zone by a force supplied by a pressurized gas known as a transfer gas. As the core of the present invention is the use of a pressurized carbon dioxide atmosphere in the sedimentation zone, it is most economical to employ pressurized carbon dioxide as the transfer gas and as the pressurized gas above the sedimentation zone with carbon dioxide gas. However, if desired, other means such as a pump may be used for this transfer. Also, an inert gas, such as nitrogen, may be employed as a transfer gas so long as carbon dioxide is present during the sedimentation step. It has been found that nitrogen is an inert gas with respect to settling rate. That is, its presence or absence at various pressures does not significantly alter such rate.

The striking effect of a pressurized carbon dioxide gas atmosphere on enhancement of the initial sedimentation rate is illustrated in the example herein. A certain minimum partial pressure of carbon dioxide is required to provide such enhancement for a given system which depends upon a number of variables. One important variable is the anti-solvent ratio. As set out in the examples, the beneficial effect of the carbon dioxide to atmosphere is only achieved above the minimum ratio. Another factor is the partial pressure of the carbon dioxide in the sedimentation vessel. Thus, enhancement is increased as with increasing carbon dioxide pressure. In the below example, the minimum effective carbon dioxide pressure for the particular system is 170 psig. Such minimum pressure must be determined for each system because of the many other parameters of potential influence.

Although the example only illustrates the effect of a 100% carbon dioxide atmosphere, it is believed that the effectiveness of the carbon dioxide is directly related to its partial pressure. Thus, a decrease by 50% of the total pressure of a total carbon dioxide atmosphere would have the same effect as an atmosphere at the initial total pressure with half the gas atmosphere replaced with an inert gas. In that regard, nitrogen has been found to be an inert gas with respect to enhancement of the sedimentation rate. On the other hand, other gases such as methane appear to have an effect similar to, but less than that of carbon dioxide. It is believed that other alkanes, (e.g., ethane and propane) and carbon monoxide have a similar but less beneficial effect. Carbon dioxide is far less expensive than the alkanes as it is produced as a waste by-product of the coal liquification plant. In view of the ready availability and low cost of carbon dioxide and its proven beneficial effects on initial settling rates, it is preferable to employ an atmosphere including a major portion, i.e., at least 50% by volume, to as high as 100% carbon dioxide. However, other gases could be employed in the atmosphere without decreasing the beneficial effects of the carbon dioxide partial pressure in the atmosphere.

A further disclosure of the nature of the present invention is provided by the following specific example of the practice of the invention. It should be understood that the data disclosed serve only as examples and are not intended to limit the scope of the invention.

EXAMPLE

Referring to FIG. 1, the initial settling rate is plotted against anti-solvent ratio for a carbon dioxide atmosphere in comparison to a nitrogen atmosphere at the same pressure. (As set out above, nitrogen does not influence settling rate.) The feed material was SRC filter feed containing three parts of recycle solvent to one part of coal. The anti-solvent was n-decane. The temperature of the mixture was 500° F. The above two components were mixed in a mixing vessel under sequential mixing conditions of 550 rpm for two minutes and 250 rpm at 28 minutes. Thereafter, the mixture was transferred under pressure supplied from a transfer gas to a settling chamber. The illustrated transfer gases were nitrogen and carbon dioxide. Then, the same transfer gas was maintained in the pressurized settling chamber at the indicated pressures on the graph. In addition to the points plotted at 200 psig, the values for carbon dioxide at pressures of 100, 150 and 250 psig are illustrated at an anti-solvent to SRC ratio of 0.375.

It is apparent from the above plot that for the indicated system at solvent to SRC ratios above 0.32, the initial settling rate is significantly higher in a pressurized carbon dioxide atmosphere than in a nitrogen atmosphere. Conversely, at lower anti-solvent ratios, the opposite effect is observed. This figure illustrates the unexpected significant increase in the initial settling rate due to the presence of the atmosphere of carbon dioxide.

The initial settling rate, measured in centimeters per hour, is a measurement of the interface of mineral content as it begins to settle prior to sufficient accumulation in the bottom of sedimentation cell to have a counter-influence. X-ray pictures are taken at intervals after settling starts, say at 2, 4, 6, 8, 10, 20, 40 and 60 minutes. The interface heights are located from the X-ray negatives yielding data points to plot the initial settling rate.

In the figure, at an anti-solvent ratio of 0.375, the carbon dioxide pressure was varied. At above 175 psig of carbon dioxide pressure, the sedimentation rate was above that nitrogen pressure of 200 psig. The sedimentation rate continuously increased with increasing carbon dioxide pressure. Conversely, at carbon dioxide pressures lower than 175 psig, the sedimentation rate is below that for nitrogen at 200 psig.

What is claimed is:

1. A method for increasing the sedimentation of asphaltic material and solid mineral matter from coal-derived liquid containing the same, comprising the steps of:
    (a) mixing said coal-derived liquid with an anti-solvent capable of promoting precipitation of asphaltic material and enhancing the initial settling rate of said solid mineral matter, said anti-solvent selected from the group consisting of saturated noncyclic hydrocarbons, cyclic hydrocarbons, aromatic hydrocarbons, and mixtures thereof, and
    (b) holding said mixture under a pressurized atmosphere having carbon dioxide as its major component by volume to precipitate and settle said asphaltic material and said solid mineral matter from said coal-derived liquid.

2. The method of claim 1 in which said anti-solvent comprises mixed noncyclic hydrocarbons.

3. The method of claim 1 in which said atmosphere consists essentially of carbon dioxide.

4. The method of claim 3 in which the mineral matter comprises a mixture of silicates and iron sulfides.

5. The method of claim 3 in which the precipitated mineral matter is separated from said coal-derived liquid.

6. The method of claim 1 in which said coal-derived liquid comprises solvent refined coal.

7. The method of claim 1 in which step (a) is performed in a mixing vessel, step (b) is performed in a separate sedimentation vessel, and the same type of gas as said pressurized atmosphere is supplied under pressure to said mixing vessel to urge and transfer said mixture from the former vessel to the latter one.

* * * * *